United States Patent
López et al.

(10) Patent No.: US 8,836,927 B2
(45) Date of Patent: Sep. 16, 2014

(54) SYSTEM FOR IMPROVING THE DYNAMIC RANGE AND REDUCING MEASUREMENT UNCERTAINTY IN FIBRE OPTIC DISTRIBUTED SENSORS AND FIBRE OPTIC DISTRIBUTED MEASUREMENT EQUIPMENT

(75) Inventors: Sonia Martín López, Madrid (ES); Juan Diego Ania Castañon, Madrid (ES); Pedro Corredera Guillén, Madrid (ES); Miguel González Herraez, Álcala de Henares (ES)

(73) Assignee: Entidad Publica Empresarial Administrador de Infraestructuras, Ferroviarias (ES)

( * ) Notice: Subject to any disclaimer, the term of this patent is extended or adjusted under 35 U.S.C. 154(b) by 86 days.

(21) Appl. No.: 13/321,369

(22) PCT Filed: May 20, 2010

(86) PCT No.: PCT/ES2010/070340
§ 371 (c)(1), (2), (4) Date: Nov. 18, 2011

(87) PCT Pub. No.: WO2010/133744
PCT Pub. Date: Nov. 25, 2010

(65) Prior Publication Data
US 2012/0062875 A1 Mar. 15, 2012

(30) Foreign Application Priority Data
May 22, 2009 (ES) .................................. 200930201

(51) Int. Cl.
| | |
|---|---|
| G01N 21/00 | (2006.01) |
| G02B 6/00 | (2006.01) |
| H01S 3/00 | (2006.01) |
| G01D 5/353 | (2006.01) |
| H04B 10/291 | (2013.01) |

(52) U.S. Cl.
CPC ............ G01D 5/353 (2013.01); G01D 5/35348 (2013.01); H04B 10/2916 (2013.01)
USPC ............................. 356/73.1; 385/12; 359/334

(58) Field of Classification Search
None
See application file for complete search history.

(56) References Cited

U.S. PATENT DOCUMENTS

| | | | |
|---|---|---|---|
| 6,941,074 B2* | 9/2005 | Nakamura et al. | ............... 398/92 |
| 6,947,207 B2* | 9/2005 | Inoue | ............................ 359/334 |

(Continued)

FOREIGN PATENT DOCUMENTS

| | | |
|---|---|---|
| CN | 201104243 Y | 8/2008 |
| EP | 1339178 A1 | 8/2003 |
| WO | WO 99/66607 A2 | 12/1999 |

OTHER PUBLICATIONS

International Search Report dated Sep. 6, 2010, issued in corresponding international application No. PCT/ES2010/070340.

(Continued)

Primary Examiner — Gordon J Stock, Jr.
(74) Attorney, Agent, or Firm — Ostrolenk Faber LLP

(57) ABSTRACT

The present disclosure is based on distributed amplification based on the Raman Effect, consisting of one or more pump lasers (5) at various wavelengths combined with a variable number of fiber optic reflectors (6). These elements induce in the fiber optic sensor (4) or measurement object the necessary conditions for the propagation of the sensor or measurement equipment signals in virtual transparency mode, improving the signal-to-noise ratio in the sensor and measurement equipment signal, improving the dynamic range and increasing the range of the sensor or measurement equipment by up to 250 km.

6 Claims, 1 Drawing Sheet

(56) References Cited

U.S. PATENT DOCUMENTS

| | | | |
|---|---|---|---|
| 7,142,356 B2* | 11/2006 | Zhou et al. | 359/334 |
| 7,420,666 B2* | 9/2008 | Maehara et al. | 356/73.1 |
| 7,443,575 B1 | 10/2008 | Iannone et al. | |
| 2002/0015220 A1 | 2/2002 | Papernyl et al. | |
| 2009/0263069 A1* | 10/2009 | Hartog | 385/12 |

OTHER PUBLICATIONS

J. D. Ania-Castañón, T. J. Ellingham, R. Ibbotson, X. Chen, L. Zhang, and S. K. Turitsyn, "Ultralong Raman fiber lasers as virtually lossless optical media," Phys. Rev. Lett.96(2), 023902 (Z006).

J. D. Ania-Castañón, V. Karalekas, P. Harper, and S. K. Turitsyn, "Simultaneous spatial and spectral transparency in ultra-long fiber lasers," Phys. Rev. Lett.101(12), 123903 (2008).

M. Gonzalez-Herraez, S. Martin-Lopez, M. Alcon-Camas, P. Corredera, L. Thevenaz, and J. D. Ania-Castañón, "Ultra-long range distributed fibre sensing using virtually transparent propagation," in CLEO/Europe and EQEC 2011 Conference Digest, OSA Technical Digest (CD) (Optical Society of America, 2011), paper CH6_1.

Juan Diego Ania-Castañón, "Design and simulation of ultra-long Raman laser links for optical signal transmission", Proc. SPIE 7386, Photonics North 2009, 73862J.

Félix Rodríguez-Barrios, Sonia Martín-López, Ana Carrasco-Sanz, Pedro Corredera, Juan Diego Ania-Castañón, Luc Thévenaz, and Miguel González-Herráez, Distributed Brillouin Fiber Sensor Assisted by First-Order Raman Amplification, Journal of Lightwave Technology vol. 28, No. 15, Aug. 1, 2010.

Sonia Martin-Lopez, Mercedes Alcon-Camas, Felix Rodriguez, Pedro Corredera, Juan Diego Ania-Castañón, Luc Thévenaz and Miguel Gonzalez-Herraez, "Brillouin optical time-domain analysis assisted by second-order Raman amplification", Aug. 30, 2010 / vol. 18, No. 18 / Optics Express 18769.

* cited by examiner

SYSTEM FOR IMPROVING THE DYNAMIC RANGE AND REDUCING MEASUREMENT UNCERTAINTY IN FIBRE OPTIC DISTRIBUTED SENSORS AND FIBRE OPTIC DISTRIBUTED MEASUREMENT EQUIPMENT

CROSS REFERENCE TO RELATED APPLICATIONS

The present application is a 35 U.S.C. §371 National Phase conversion of PCT/ES2010/070340, filed May 20, 2010, which claims benefit of Spanish Application No. P 200930201, filed May 22, 2009, the disclosure of which is incorporated herein by reference. The PCT International Application was published in the Spanish language.

OBJECT OF THE INVENTION

The present invention belongs to the physical technology sector and is applicable to measurement systems based on fibre optic distributed sensors and fibre optic distributed measurement equipment.

The main object of the present invention is a system for improving the dynamic range (increased measurement range) and reducing measurement uncertainty in fibre optic distributed sensors and in fibre optic distributed metrology equipment, based on distributed amplification by the fibre Raman Effect and using different pump lasers and reflectors.

BACKGROUND OF THE INVENTION

Distributed sensors constitute an attractive and very promising technique for sensing with long wavelengths of physical parameters such as deformation and temperature. In recent years, the application of sensors based on fibre optic technology and linear effects such as Rayleigh scattering, and non-linear effects such as Raman scattering and Brillouin scattering to instrumentation for all types of civil infrastructures (bridges, tunnels, buildings, dams . . . ), transport (airplanes, railway lines . . . ) and industry (gas conduits, water conduits, oil rigs . . . ) has become increasingly widespread.

Moreover, fibre optic distributed metrology techniques are of great help for evaluating and controlling existing fibre optic cabling, basically for applications in the field of communications. In recent years, demand for installation of fibre optic cable has experienced such dramatic growth that it requires leveraging existing cabling and new installations to a maximum. For this reason, having measurement equipment that will allow distributed metrological examination of the specific characteristics of optical fibre has become increasingly important. The basic parameters to be determined include polarisation mode dispersion (PMD) and chromatic dispersion and parameters derived therefrom, such as null dispersion wavelength ($\lambda_0$).

Rayleigh scattering occurs in any material due to the interaction of photons with the atoms that compose the material. As a result of this interaction, in the specific case of optical fibre, part of the optical signal returns therethrough towards the emitting source.

The Raman Effect is the absorption and subsequent emission of a photon on interacting with electrons in a material medium wherein energy exchange occurs with said medium, causing the electron pass to a virtual state and generating a new photon having greater or less energy than the incident photon. The loss or gain or energy is explained by the generation of a particle called optical phonon.

The Brillouin Effect is similar to that described as the Raman Effect, except that energy exchange is explained by the generation of an acoustic phonon. Both effects that produce new photons at different frequencies to those of the incident photon (or pump photon) are leveraged in the present invention and are used as distributed amplifiers, as low-signal photons draw energy from the photons generated by these processes throughout their propagation through the optical fibre.

Non-linear Raman and Brillouin scattering phenomena which occur in optical fibre are directly dependent on the temperature variations (Raman and Brillouin) and deformations (Brillouin) experienced by said optical fibre, becoming direct sensing techniques for these magnitudes.

Polarisation Mode Dispersion (PMD) is the broadening that the light pulse guided through the fibre undergoes due to the difference in propagation speed between the two basic polarisation states transmitted (slow mode and fast mode). In the case of uniform single-mode optical fibre, symmetrical and installed in such a manner that the curvatures do not induce birefringence, it should have null PMD. In fact, all random fluctuations of curvatures, fibre asymmetries, etc., cause random fluctuations of birefringence throughout the fibre and therefore differences in light pulse time-of-flight, depending on whether it is oriented towards one polarisation or another. Random fluctuations in fibre birefringence occur in all installed fibres and depend on the physical characteristics of the fibres (refraction index, dopant concentration, non-circularity and core ellipticity . . . ), on the manner in which the fibre has been installed (curvatures, micro-curvatures, pressures and tensions . . . ), on the polarising elements included in the transmission line (filters, isolators, Bragg networks . . . ) and on atmospheric constraints (particularly temperature).

Chromatic dispersion (CD) is a phenomenon that appears as a consequence of the linear propagation of light through the fibre and directly related to the dependence of the propagation constant on frequency ( )($D=d_1/d$, where $\lambda$ is the light wavelength propagated through the fibre and $\beta_1$ is the derivative of $\beta$ in relation to frequency $\omega$). The effect of chromatic dispersion on the signals propagated through the optical fibre is an undesirable broadening of the light pulses that contain the information. This requires compensation of said broadening in order to maintain disturbance-free communication, due to which it is crucial to know the dispersion curve of the fibres with metrological accuracy. Typical chromatic dispersion curves of commercial optical fibres have a wavelength for which parameter D is null, a very interesting fact when deciding what light wavelengths will be used in communication.

Based on these physical phenomena, different varieties of sensors have been developed over the years, such as those based on OTDR (Optical Time Domain Reflectometer) linear scattering and OFDR (Optical Frequency Domain Reflectometer) and those based on non-linear scattering such as ROTDR (Raman Optical Time Domain Reflectometer), ROFDR (Raman Optical Frequency Domain Reflectometer), BOTDR (Brillouin Optical Time Domain Reflectometer), BOTDA (Brillouin Optical Time Domain Analyzer) and BOFDA (Brillouin Optical Frequency Domain Analyzer).

Likewise, in the case of fibre optic metrology, dispersion distribution measurement techniques have been developed (DC, distribution of associated parameters and PMD) based on POTDR (Polarisation Optical Domain Reflectometer), COTDR (Coherent Optical Time Reflectometer) and TCOTDR (Tunable Coherent Optical Time Reflectometer, also known as OCT-Optical Coherent Reflectometry) and similar frequency domain methods (POFDR, COFDR and TCOFDR).

All of these techniques can be implemented in classical detection and detection based on photon counters. They all have an insurmountable limitation inherent to optical fibre, which is the attenuation suffered by light on propagating therethrough. The measurement length ranges between tens of metres and thirty metres.

The fibre distribution sensing systems currently available in the market are:
- FOS-TA: Fibre Optic Sensory Technology and Applications. Distributed Temperature and Strain Sensory (DTS & DTSS) System. Singapore. Maximum measurement range 30 km.
- Omnisens: DiTeSt: Distributed Temperature & Strain monitoring instruments. Switzerland. Up to 30 km, SMARTECH markets a similar instrument (Switzerland).
- Neubrex Ldt. Japan. NEUBRESCOPE: Pre-Pump BOTDA Technique. Up to 25 km.
- AGILENT Distributed Temperature System N4385A/N4386A. Based on Raman scattering in multi-mode fibre. Up to 12 km.
- YOKOGAWA AQ8603 Optical Fibre Strain Analyser, based on spontaneous Brillouin scattering.

For fibre optic distributed metrology:
EXFO Distributed PMD Analysis FTB-5600 based on TCOTR.
EXFO Single-Ended Dispersion Analyser FTB-5700.
GAP Distributed dispersion analyser based on photon counting techniques.
LUCIOL INSTRUMENTS OTDR LOR-200/220 and v-OTDR.
ANRITSU MW9076OTDR.

In all of these systems, in both sensors and metrology, measurement uncertainty increases with distance from the sensing point or measurement, due to the increase, among other things, of the measurement signal-to-noise ratio, with the ensuing error in the measured magnitude.

DESCRIPTION OF THE INVENTION

The invention focuses on the description of the system for improving the dynamic range and reducing measurement uncertainty in fibre optic distributed sensors, as well as on fibre optic distributed metrology equipment, based on a distributed fibre amplification system based on the Raman Effect using different laser pumps and fibre optic reflectors. These elements induce in the fibre optic sensor or measurement object the necessary conditions for the propagation of the sensor signals in virtual transparency mode, improving the signal-to-noise ratio in the sensor or measurement equipment signal, improving the dynamic range and increasing the range of both by up to 250 km.

The present invention also ensures that measurement uncertainty in each of the variants being protected herein does not vary with distance from the sensing point, said uncertainty remaining constant throughout the propagation (distances of up to 250 km).

Likewise, different development possibilities of the described technique are described:
a) The distributed amplification system is based on bi-directional Raman pumping with a single frequency from both ends of the fibre optic sensor or measurement object, wherein the sensory or measurement signals have wavelengths similar to those of the first Stokes-Raman displacement of the pump lasers.
b) Variant wherein the distributed amplification system is based on uni- or bidirectional first-order or higher-order Raman pumping with various different frequencies, capable of cascaded amplification therebetween by means of cascaded Raman dispersion, wherein the sensory or measurement signals have wavelengths similar to those of the first Stokes displacement of the pump lasers of lowest frequency.
c) Variant wherein the distributed amplification system is complemented by the use of one or more reflectors disposed in line with the fibre optic sensor or measurement object.
d) Variant wherein the distributed amplification system is complemented by the use or one or more reflectors, which are used to create an active optical cavity in the sensory fibre or measurement object, thereby enabling the fibre to be a virtually transparent medium.

DESCRIPTION OF THE DRAWINGS

In order to complete the description being made and with the object of helping to better understand of the characteristics of the invention, in accordance with a preferred example of practical embodiment thereof, accompanying said description as an integral part thereof, is a set of drawings wherein, in an illustrative and non-limiting manner, the following has been represented.

PREFERRED EMBODIMENT OF THE INVENTION

Figure 1:
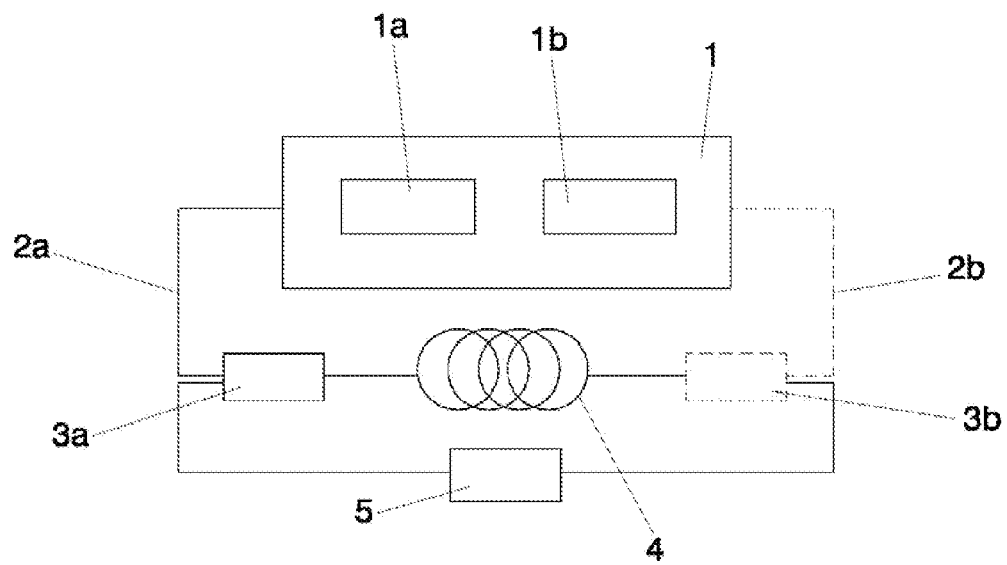
FIG. 1 shows a diagram in accordance with embodiment proposal a) of the system object of the invention.

The system proposed for improving the dynamic range and reducing measurement uncertainty in distributed sensors and fibre optic distributed metrology equipment is applied to any type of fibre optic distributed sensor (1) or fibre optic distributed measurement equipment, regardless of its measurement technology (OTDR, OFDR, ROTDR, ROFDR, BOTDR, BOTDA, BOFDA, COTDR), as well as any type of PMD distributed measurement equipment, chromatic dispersion or parameters derived therefrom (POTDR, PMD-OTDR, DC-OTDR, FWM-OTDR) and will be coupled to an input/output port (2a) or input (2a) and output (2b) ports by means of couplers ((3a) or (3a) and (3b)) depending on the configuration wherein the system measures. Said system can be materialised in the following examples:
a) One or more light sources (1a). The light emitted by these is injected through the input port (2a) in the fibre optic sensor (4) or measurement object by means of a coupler (3). These will be one or several light sources (1a) depending on whether the distributed sensor (1) or measurement system susceptible of being improved is based on the interaction of two signals introduced in the fibre optic sensor (4) in counterpropagation directions (for example, the distributed sensors (1) based on the Brillouin Effect) or on the interaction of a single signal with the medium (OTDR, distributed sensors (1) based on the Raman Effect, POTDR, COTDR). Additionally, these signals shall be emitted in pulse or continuous mode depending on the particular design of the sensor or equipment.

In the case of distributed sensors (1), the fibre optic sensor (4) is laid along the element object of sensing and will be used as a medium in which to perform amplification based on the Raman Effect. In the case of fibre optic distributed metrology, this will be the medium where distributed amplification will take place. The detection will be carried out using appropriate spectral analysis systems or detectors (1b) which will be connected through the corresponding port (input/output (2a), input (2a) and/or output (2b)) to one of the ends of the fibre optic sensor (4).

Figure 2:
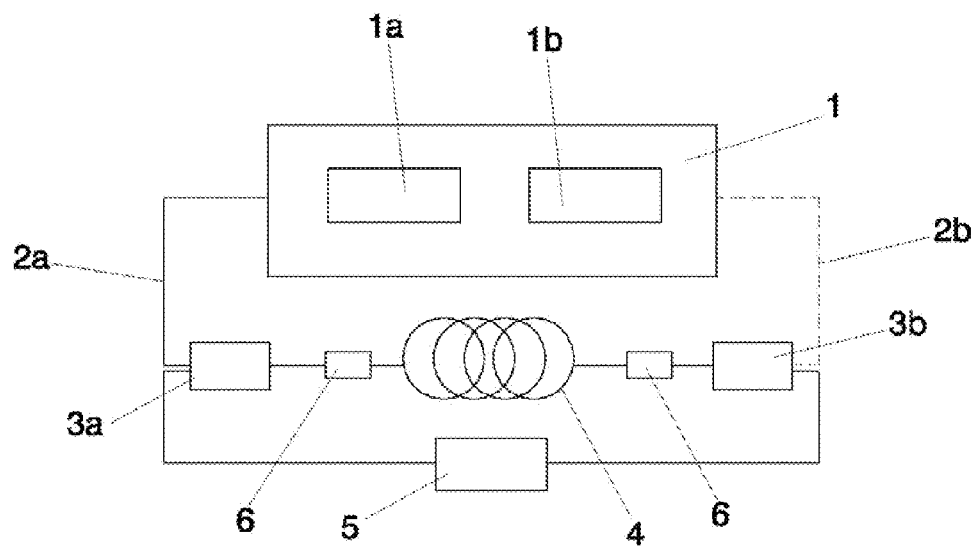
FIG. 2 shows a diagram in accordance with embodiment proposal b) of the system object of the invention.

Firstly, the diagram represented in FIG. 1 based on the distributed Raman Effect throughout the fibre optic sensor (4) or measurement object, which shall be pumped from both ends using one or several pump lasers (5), is proposed. In this manner, we will have bidirectional pumping to a wavelength. This wavelength must be such that its first-order Stokes-Raman dispersion is proximate to the wavelength of the signals transmitted by the fibre optic sensor (4). In silica fibre optic sensors (4) this Stokes signal is materialised in an amplification band with a spectral width of terahertz order. In this manner the transmitted signals will be symmetrically amplified throughout the fibre optic sensor (4) in relation to the middle point thereof. In this experimental diagram the light propagation directions must be taken into account and introduce the necessary isolating components for said signals to be propagated, without interferences with other light beams.

b) The second embodiment proposal of this invention differs from the previous embodiment proposal in that in this case the Raman pumping(s) are introduced unidirectionally into the fibre optic sensor (4) or measurement object and shall have the necessary intensity characteristics to generate, in an initially spontaneous manner, higher-Stokes-orders. These new signals will amplify one another consecutively, thereby achieving the spectral displacement of the Raman amplification phenomenon to the desired frequency, which in this case will be proximate to the frequency of the transmitted signals.

c) Same diagram as that described in section b), but using the bidirectional Raman pumping diagram described in section a).

d) The fourth experimental proposal is based on the ideas described in sections a), b) and c), but in this case fibre reflectors (6) are introduced in line with the fibre optic sensor (4) or measurement object. In this manner, the generation of higher-order Stokes frequencies described in section b) will be favoured by the wavelength selection that will take place in said reflectors (6), of a specific section of the Raman gain curve.

e) Finally, the diagram shown in FIG. 2 is proposed. In this experimental development we work on the diagram described in section d), but the reflectors (6) are disposed on both ends of the fibre optic sensor (4) or measurement object, in such a manner as to form an optical cavity wherewithin the cascade amplification of the successive Stokes orders takes place.

What is claimed is:

1. A system for improving dynamic range and reducing measurement uncertainty in fibre optic distributed sensors or fibre optic distributed measurement equipment, the system comprising:
   a fibre optic distributed sensing system based on Rayleigh scattering, Raman Effect or Brillouin Effect, the fibre optic distributed sensing system comprising at least one probe and pump signal emission source, and at least one detector or spectral analyzer;
   a fibre optic sensor that transmits signals, said fibre optic sensor being used as a sensory element which is connected to the fibre optic distributed sensing system by at least one input/output port, through at least one coupler; and
   a Raman Effect distributed amplification system comprising at least one pump laser adapted to pump the fibre optic sensor from at least one of its ends.

2. The system of claim 1, wherein the Raman Effect distributed amplification system is based on Raman bidirectional pumping with a single frequency from both ends of the fibre optic sensor,
   wherein the signals transmitted by the fibre optic sensor have wavelengths proximate to those of a first Stokes-Raman displacement of the pump lasers.

3. The system of claim 1, wherein the Raman Effect distributed amplification system is based on higher-order unidirectional or bidirectional Raman pumping with several different frequencies, and configured for cascade amplification therebetween by Raman scattering,
   wherein the signals transmitted by the fibre optic sensor have wavelengths proximate to those of a first Stokes displacement of the lowest-frequency Raman pump lasers.

4. The system of claim 1, further comprising at least one reflector combined with the fibre optic sensor, said reflector being adapted to improve the signal-to-noise ratio in the signals transmitted by the fibre optic sensor and increase the length of scope of the sensor or distributed measurement equipment.

5. The system of claim 4, wherein the reflector is disposed in line with the fibre optic sensor.

6. The system of claim 4, wherein the reflector is disposed on both ends of the fibre optic sensor, in such a manner as to form an active optical cavity to enable the fibre optic sensor to be a virtually transparent medium.

* * * * *